April 16, 1935. J. D. BATES, JR 1,997,992
CUTTER
Filed July 19, 1934
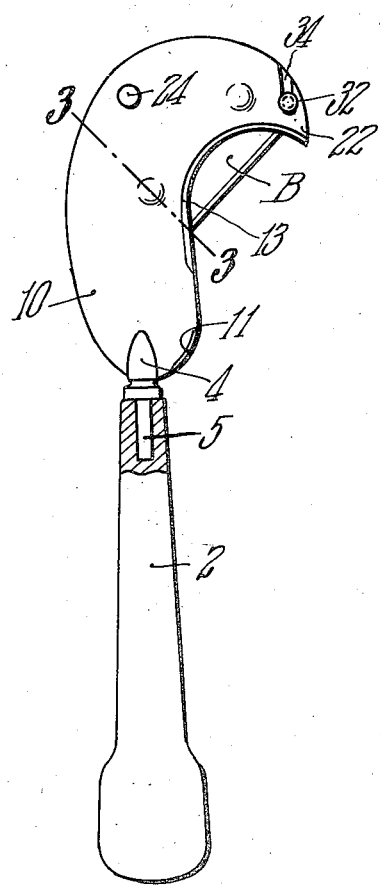
Fig. 1.
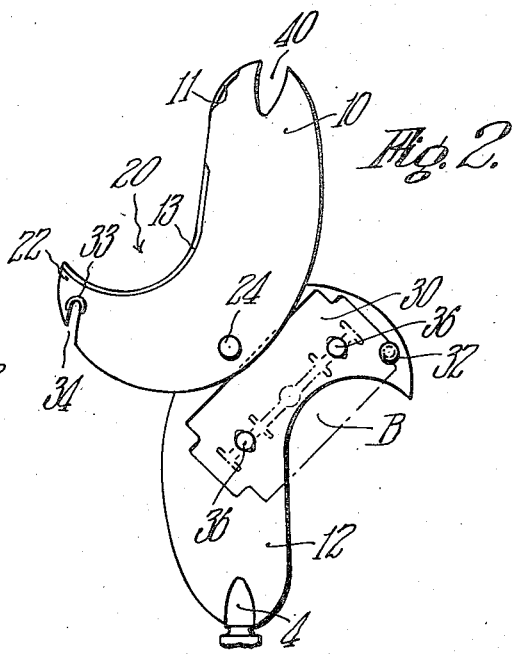
Fig. 2.
Fig. 3.
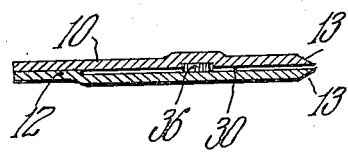
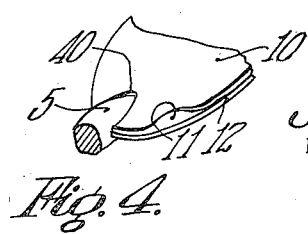
Fig. 4.
INVENTOR.
Joseph D. Bates Jr.
BY Walter C. Ross.
ATTORNEY.

Patented Apr. 16, 1935

1,997,992

UNITED STATES PATENT OFFICE 1,997,992

CUTTER

Joseph D. Bates, Jr., Springfield, Mass.

Application July 19, 1934, Serial No. 735,966

1 Claim. (Cl. 30—9)

This invention relates to improvements in cutters and is directed more particularly to the provision of a novel and simple cutting tool which may be readily and safely handled and which is inexpensive to manufacture.

The principal objects of the invention are directed to the provision of a cutting tool which is simple in form and which has a removable blade adapted to be rigidly held in place.

Another object of the invention is to provide a novel cutter holder having parts so arranged that a razor blade of usual form may be used therein.

A further object of the invention is the provision of a cutter wherein the blade is held in such a way that an object to be cut is directed onto the cutting edge of the blade.

Various other novel objects and advantages of the invention will readily appear after a reading of the following description and reference will be had therein to the accompanying drawing wherein:

Fig. 1 is a side elevational view of a cutter embodying the novel features of the invention;

Fig. 2 is another side elevational view of the cutter showing the parts of the cutter in a different relative relation;

Fig. 3 is a sectional view on the line 3—3 of Fig. 1 with the blade omitted; and Fig. 4 is a fragmentary perspective view of certain features of the invention.

Referring now to the drawing more in detail, the invention will be fully described.

At 2 there is shown a handle member and this may be of various shapes and it may be formed from various relatively rigid materials such as wood, steel, bakelite, or other composition materials. A hub 4 has a shank 5 extending into the handle as shown in Fig. 1 and the hub is preferably slightly rounded as shown.

A pair of relatively movable plate members 10 and 12 are provided and these are adapted to receive therebetween a blade such as B. One of the plates such as 10 is rigidly associated with the hub 5 as shown in Fig. 1 as by welding or other suitable means.

The plates 10 and 12 may be formed from various materials but they are preferably formed of relatively thin and hard yet somewhat yieldable material such as sheet steel or the like. The plates may be of various shapes but preferably they are formed somewhat hook-shaped as shown so as to have throats 20 and prongs 22 at a side thereof.

The plates 10 and 12 are arranged for relative movements as by a pivot 24. In this way they are movable in parallel planes.

According to the preferred form of the invention, a blade-receiving depression or seat 30 is provided on the inner side of at least one of the plates such as plate 10. This is of such size and shape that it is adapted to receive a blade shown by dot-dash lines. The blade shown is a common form of razor blade. If desired, complemental depressions or seats may be provided in the adjacent sides of both of the plates.

A raised portion 11 is preferably provided on the plate 10 to serve as a finger abutment. In this way, the plates may be more readily moved relative to one another.

Adjacent the outer end of one of the plates such as the plate 12 there is provided a stud 32 which extends toward the other plate and a slot 34 is provided in the corresponding end of the other plate for receiving the stud 32. A ridge 33 may be formed around the slot 34 which is arranged to underlie the head of the stud 32. When the plates are in superposed relation the stud and ridge function to hold them in pressed-together relation.

Studs 36 are provided in one of the plates such as 12 and these extend inwardly from the depression or seat 30 in spaced relation. They are adapted to receive the usual spaced apertures of a razor blade B as shown by dot-dash lines in Fig. 2.

At the inner end of the plate 10 there is provided a socket 40 which is adapted to receive and engage the hub of the handle. This further insures against relative swinging movements of the plates from their superposed relation.

It may be seen that when the plates are swung into the position shown in Fig. 1 with the stud 32 received in the slot 34 and the socket 40 receiving the hub 4, the plates are held against relative swinging movements and in blade-embracing position.

It will be noted that by providing a throat on at least one of the plates that the cutting edge of the blade B extends across the throat from a point below the prong 22 to an inner adjacent side of the plate. In this way when the cutter is drawn towards the object being cut, such as a flower stem or a piece of string, the object is readily directed onto the cutting edge. According to the preferred form of the invention, the marginal edges of the throat portions 20 are slightly beveled as shown at 13 in Fig. 3.

Not only is the tool of this invention simple in form and economical to manufacture, but it provides a practical use for used razor blades.

While I have described the invention in great detail and with respect to a preferred form thereof, it is not desired to be limited thereto since many changes and modifications may be made therein without departing from the spirit and scope of the invention.

What it is desired to claim and secure by Letters Patent of the United States is:

A tool of the class described comprising in combination, a relatively thin substantially flat plate, a handle, a hub on the handle secured to the lower end of said plate having a part extending upwardly above the plane of the upper face of the plate, said plate having a body portion extending upwardly and away from said hub and an outer portion extending outwardly at the upper end of the body portion and having one marginal edge formed to provide a hook-shaped throat, a second relatively thin substantially flat and yieldable plate on the upper face of the first named plate having a lower end, body and outer portions to overlie the lower end, body and outer portions of said first named plate, pivotal connections and an engageable stud and slot associated with the body portions and outer portions of the plates, a blade, and positioning means for positioning said blade relative to one of said plates so that an outer edge thereof extends angularly across the throat, all adapted and arranged whereby the second plate may swing relative to the first named plate between blade clamping and non-clamping positions and the second plate being provided with a hub receiving slot at its lower end whereby as it is swung to blade clamping position said lower end may slide over said hub and yield upwardly from the first named plate to bring the hub into the slot thereof and releasably lock the second plate in blade clamping position with the stud and slot in engagement.

JOSEPH D. BATES, Jr.